US005632375A

United States Patent [19]
Mattikow

[11] Patent Number: 5,632,375
[45] Date of Patent: May 27, 1997

[54] COMBINED FUNCTIONAL TOY AND CASSETTE HOLDER

[75] Inventor: Nina J. Mattikow, Greenwich, Conn.

[73] Assignee: Great American Audio Corp., New Rochelle, N.Y.

[21] Appl. No.: 359,583

[22] Filed: Dec. 20, 1994

[51] Int. Cl.⁶ .......................... B65D 85/575; A63H 3/00
[52] U.S. Cl. ...................... 206/387.1; 206/214; 206/232; 206/457; 206/471; 446/73; 446/302
[58] Field of Search ................................ 206/214, 232, 206/387.1, 457, 461, 471, 806; 446/71, 72, 73, 302, 369, 78, 409; 53/400

[56] References Cited

U.S. PATENT DOCUMENTS

| | | |
|---|---|---|
| 2,524,143 | 10/1950 | Smith . |
| 2,978,836 | 4/1961 | Kato .................................. 446/409 |
| 4,521,205 | 6/1985 | Spector .............................. 446/302 |
| 4,597,743 | 7/1986 | Becker et al. . |
| 4,753,346 | 6/1988 | Tsuji . |
| 4,850,924 | 7/1989 | Becker et al. . |
| 4,905,828 | 3/1990 | Dods ................................ 206/461 |
| 5,022,522 | 6/1991 | Kennedy ........................... 206/232 |
| 5,046,981 | 9/1991 | Roddy .............................. 446/81 |
| 5,059,149 | 10/1991 | Stone . |
| 5,441,149 | 8/1995 | Willard ............................. 206/214 |

*Primary Examiner*—Paul T. Sewell
*Assistant Examiner*—Luan Z. Bui
*Attorney, Agent, or Firm*—Calfee Halter & Griswold

[57] ABSTRACT

A combined amusement and audio cassette holding device and method for presenting multi-media information to children includes a functional toy having a cassette receiving cavity which receives and frictionally engages and retains one or more cassettes or disks in the cavity in a visible but protected position relative to the exterior of the toy, whereby indicia on exterior surfaces of the cassette(s) remains visible while the cassette(s) is housed in the toy. The body of the toy may be configured to physically correspond to subject matter recorder on the cassette or disk. The toy/cassette combination may be packaged with a text which also corresponds to the subject matter recorded on the audio tape and the character or object which the configuration of the toy represents.

2 Claims, 8 Drawing Sheets

1
              COMBINED FUNCTIONAL TOY AND
                      CASSETTE HOLDER

FIELD OF THE INVENTION

The present invention pertains generally to entertainment
and educational devices and materials for children and, in
particular, to multi-purpose toys.

BACKGROUND OF THE INVENTION

Children are entertained and educated by playing with
toys which they use to enact imaginary and real life scenes.
Children also enjoy music such as "sing-along" songs which
combine melodies with stories or educational information.
Music also serves as an excellent means of bringing excitement and enthusiasm to the presentation of a story or lesson
and effectively captures the attention and imagination of
children. And children are also of course interested in books,
in the presentation of graphic and textual information, as
may be further enhanced by an accompanying sound track.
   These three very common and effective entertainment and
educational media for children have heretofore been combined or associated in various formats, such as audio cassette
tapes which contain recorded readings or singing of stories
or songs printed in an accompanying book, and toys which
represent characters of a story in a book or on a tape. For
audio cassette tapes or compact disks containing information
related to a particular toy, there exists a need for keeping the
tape or disk and the toy physically together such that the toy
is available when the tape is played for the child's use and
enjoyment. Furthermore, when the child is not listening to a
cassette tape or disk, it must be put away to prevent it from
becoming lost. Tapes or disks must also be put in a protective compartment to prevent damage. The prior art has dealt
with this problem, primarily by providing plastic boxes
which may be packaged with a book or toy. Another solution
to this problem has been to include a concealed pocket or
compartment in a toy for storing a cassette or compact disk,
such as described in U.S. Pat. No. 5,059,149. Such compartments completely shroud the cassette or disk from view
such that one cannot easily determine which cassette has
been stored in the compartment. In those instances where the
information on the cassette relates to the toy, one cannot be
certain that the correct cassette has been stored with the
corresponding toy.

SUMMARY OF THE INVENTION

The present invention provides a multi-functional toy and
an assembly of media which includes such a toy in combination with multi-media entertainment and/or educational
media for children.
   In accordance with one aspect of the invention, a functional toy, having moving parts in some embodiments,
includes a cavity in the body of the toy for receiving and
storing an audio tape cassette or the like. In addition to
serving as a protective housing for cassette tapes or disks,
the toy by itself has play value functional characteristics.
The form of the toy may correspond to the information
contained on the cassette or disk.
   In accordance with another aspect of the invention, the
tape receiving cavity of the toy is dimensioned to enclose
and grip only a lower portion of the cassette such that an
upper portion of the cassette protrudes through an opening
to the cavity so that it is visible when the cassette is fully
inserted and held within the cavity. The exposed portion of
the recording tape on the lower portion of the cassette is
thereby completely shrouded and protected by the surrounding cavity of the toy, and the upper portion of the cassette is
not covered by the toy such that the cassette may be easily
gripped for removal from the cavity of the toy and an
identifying label on the cassette remains visible.
   And in accordance with a method of the invention of
presentation of multi-media information and entertainment
equipment for children, audio information which corresponds to a physical configuration of a toy is recorded upon
a recording media such as an audio tape cassette, the cassette
is physically combined with the toy by insertion of the
cassette into a cassette holding cavity in the toy, and the
combined toy and cassette is packaged together with a text
also containing information which corresponds to the
recorded audio information and the physical configuration of
the toy.
   These and other aspects of the invention are described in
detail below with reference to the accompanying figures.

DESCRIPTION OF THE FIGURES

In the accompanying figures.

DETAILED DESCRIPTION OF PREFERRED
                           EMBODIMENTS

Figure 1:
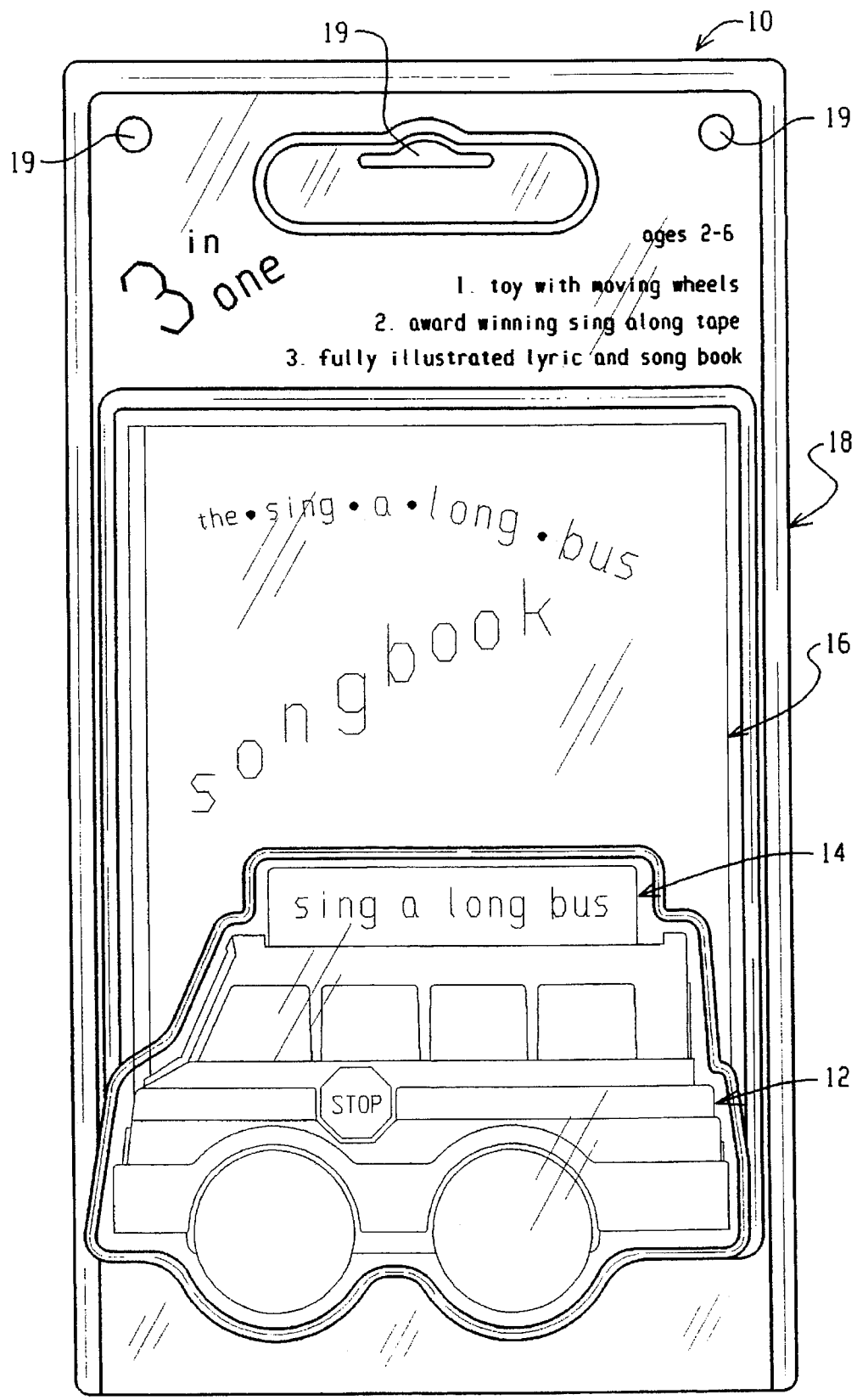
FIG. 1 is a frontal view of an embodiment of the packaged
assembly of the present invention.

As shown in FIG. 1, the invention novelly provides a
combined packaged entertainment and educational
assembly, indicated generally at 10 which includes a three-dimensional functional toy 12, an audio recording cassette
14, and a book 16, held together by a package 18 which may
be, for example, a plastic heat-sealed transparent package as
is well known in the packaging arts. As used herein, the term
"cassette" includes by equivalents and without limitations
any media for recording information in reproducible digital
or analog forms thereon such as, for example, audio tapes,
video tapes, compact optical disks and computer disks or
diskettes.
   In accordance with the invention, the audio information
recorded on a tape in cassette 14 may correspond to the
physical form or configuration of the toy 12 and to the
information printed in the book 16. The package 18 may be
provided with one or more display peg holes 19 whereby all
three elements of the assembly are visible from the front of
the package when suspended from a display peg. This results
from the book 16 being positioned aft of the toy 12 in package 18, and the partial protrusion of cassette 14 from the toy 12 as described in further detail below.

Figure 2:
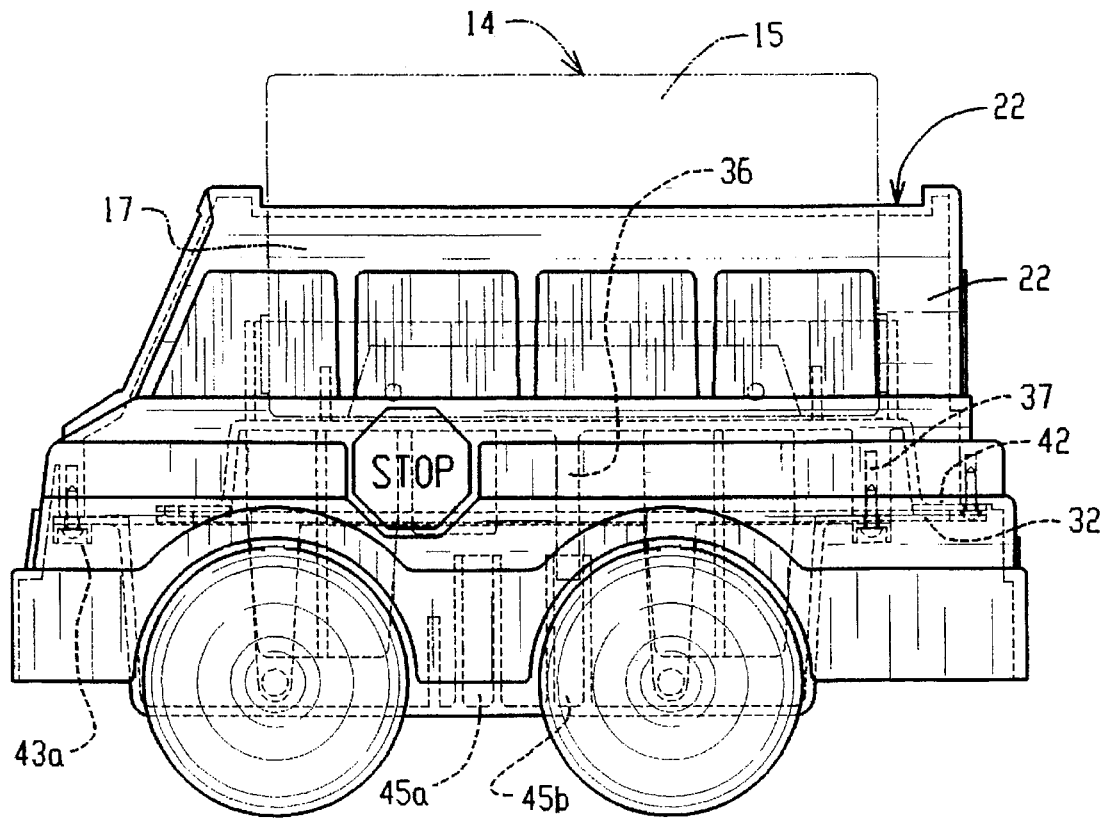
FIG. 2 is a side elevation of a multi-functional toy of the
present invention.
Figure 3:
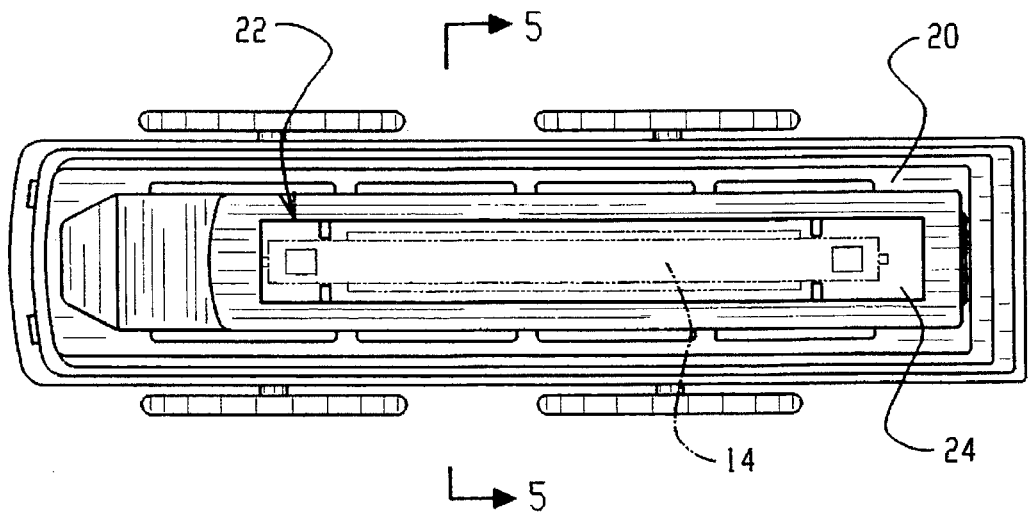
FIG. 3 is a top view of the toy of FIG. 2.
Figure 6:
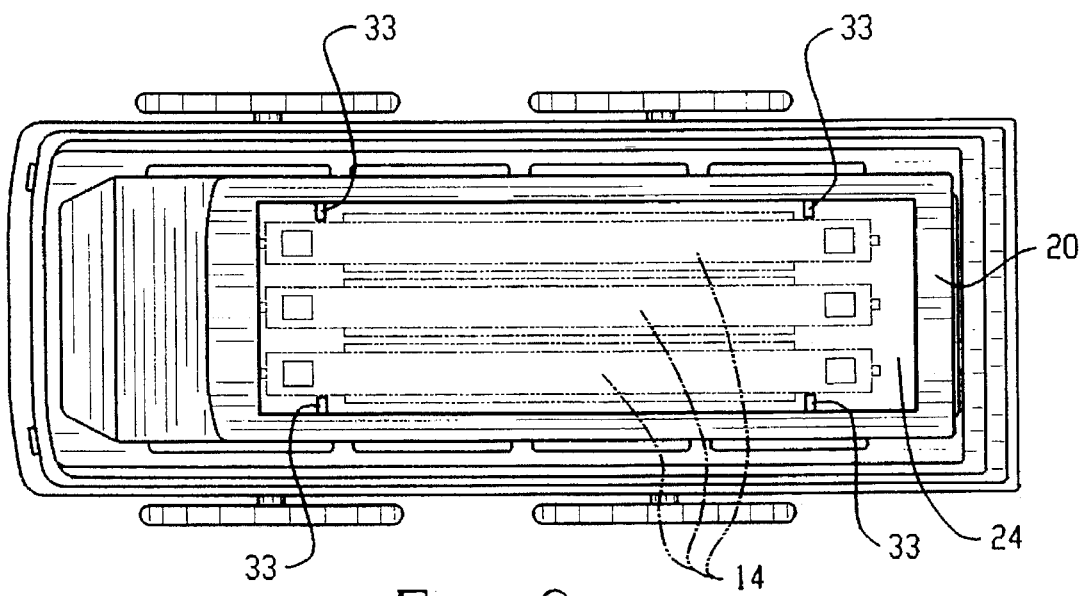
FIG. 6 is a top view of an alternate embodiment of a toy
of the present invention.

The fully-assembled "ready-to-use" multi-functional toy 12 serves as an entertainment device by itself, a storage and protector device for cassette 14, and as a form of three-dimensional representation of the subject matter of the information on the cassette tape and/or in the book. As shown in FIGS. 2 and 3, the toy 12 includes a body 20 having an opening 22 to a cassette-receiving cavity 24 which receives and houses a lower potion 17 of cassette 14 whereby the exposed portion of the tape in a cassette is fully protected. The depth dimension of cavity 24 is such that an upper portion 15 of cassette 14 is exposed above the top of toy body 20 to allow for easy grasping of the cassette 14 for removal from the toy, and to allow any graphic information applied to the upper portion 15 of the cassette to remain visible. As shown in FIG. 3, the width of cavity 24 may be dimensioned to receive a single cassette 14 or, as shown in FIG. 6, multiple cassettes positioned side-by-side.

The form of body 20 may be molded, for example from plastic, or otherwise formed in any desired configuration to physically correspond to the subject matter of the information on the tape or in the accompanying book, or not. Other non-limiting examples of forms of the toy body 20 include automobiles, aircraft, trains, animals, and any characterization or representation of any animate or inanimate object.

Figure 4:
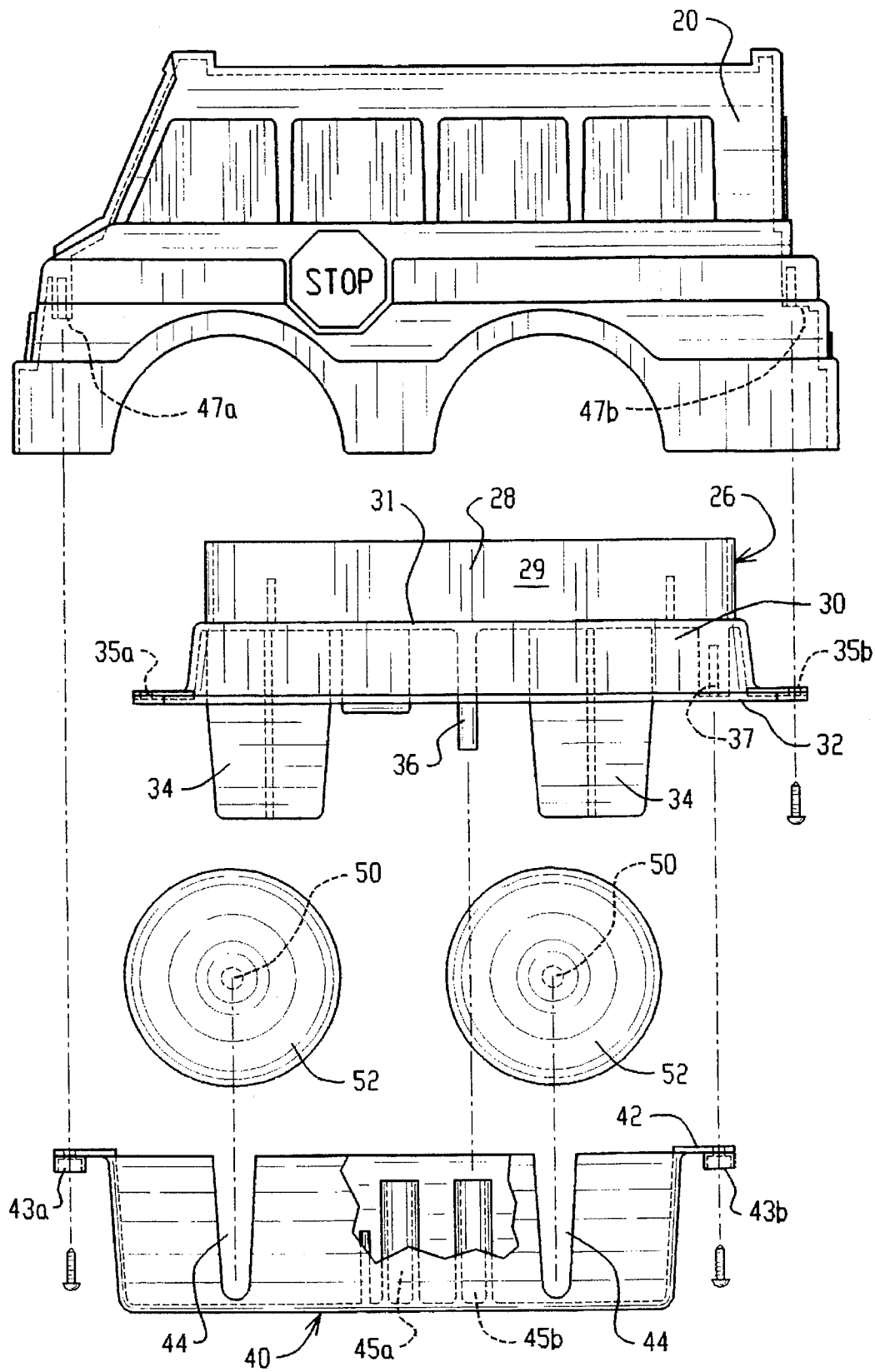
FIG. 4 is a an exploded side elevation of the toy of FIG.
2.
Figure 5:
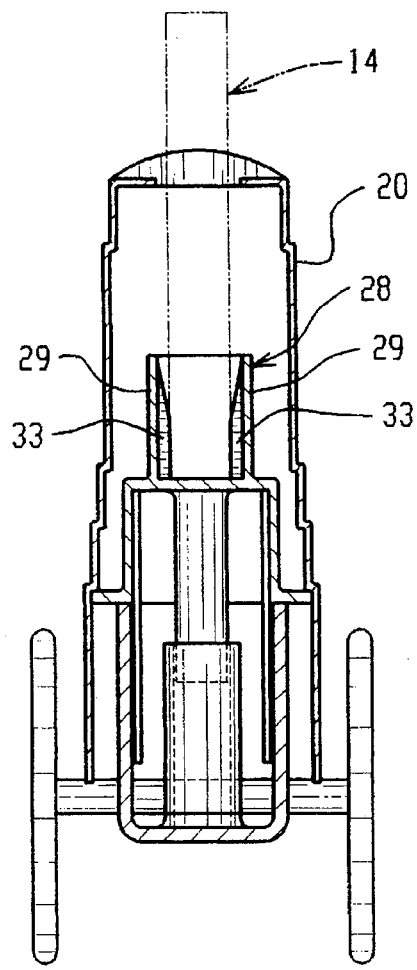
FIG. 5 is a cross-sectional view taken in the direction of
the arrows 5—5 in FIG. 3.

As shown in FIG. 4, the toy body 20 has an open bottom and is adapted to fit over and attach to a universal cassette receptacle 26. The universal cassette receptacle 26 includes a cassette-engaging box 28 formed by generally vertical walls 29 standing upon a frame 30 having a horizontal surface 31 which serves as the floor of the box 28. As best shown in FIG. 5, tapered cassette engaging tabs 33 are disposed at the intersection of vertical walls 29 and floor 31 whereby a cassette (or cassette case) fully inserted into the box 28 is slightly compressed and retained therein by friction against the tabs 33. The universal cassette receptacle 26 further includes a horizontal cassette receptacle flange 32 dimensioned for insertion into the open underside of body 20; vertical flanges 34 which extend vertically downward from frame 30, and a guide pin 36 which also extends vertically downward from frame 30. Horizontal flange 32 is provided with fastener receiving holes 35a and 35b, and 37.

As illustrated at the bottom of FIG. 4, a chassis 40 has a horizontal chassis flange 42 also dimensioned for insertion into the open underside of body 20 and provided with fastener holes 43a–43b and guide pin holes 45a and 45b. Chassis 40 also includes axle receiving wells 44 having radiused bottoms for rolling contact with axles 50 attached to wheels 52. Wheels 52 may be integrally formed with axle 50 as, for example, a single molded piece.

To assemble the toy, the axles 50 are simply placed in axle wells 44 and held there in position by fastened attachment of chassis 40 to cassette receptacle 26 at fastener holes 43, whereupon vertical flanges 34 occupy substantially the entire depth of wells 44 to entrap the axles in place at the bottom of the wells. As shown in FIGS. 2 and 5, the chassis 40 and cassette receptacle 26 are attached to the toy body by abutment of horizontal flange 32 of cassette receptacle 26 with a mounting surface 47b having a corresponding fastener hole on the interior of body 20 to thereby position the cassette engaging box 28 near the opening 22 in body 20 whereby a cassette is held in the desired position within the toy body. Similarly, horizontal chassis flange 43a abuts mounting surface 47a having a corresponding fastener hole. Horizontal flange fastener hole 43b is then aligned with fastener hole 37 of receptacle 26.

Figure 10:
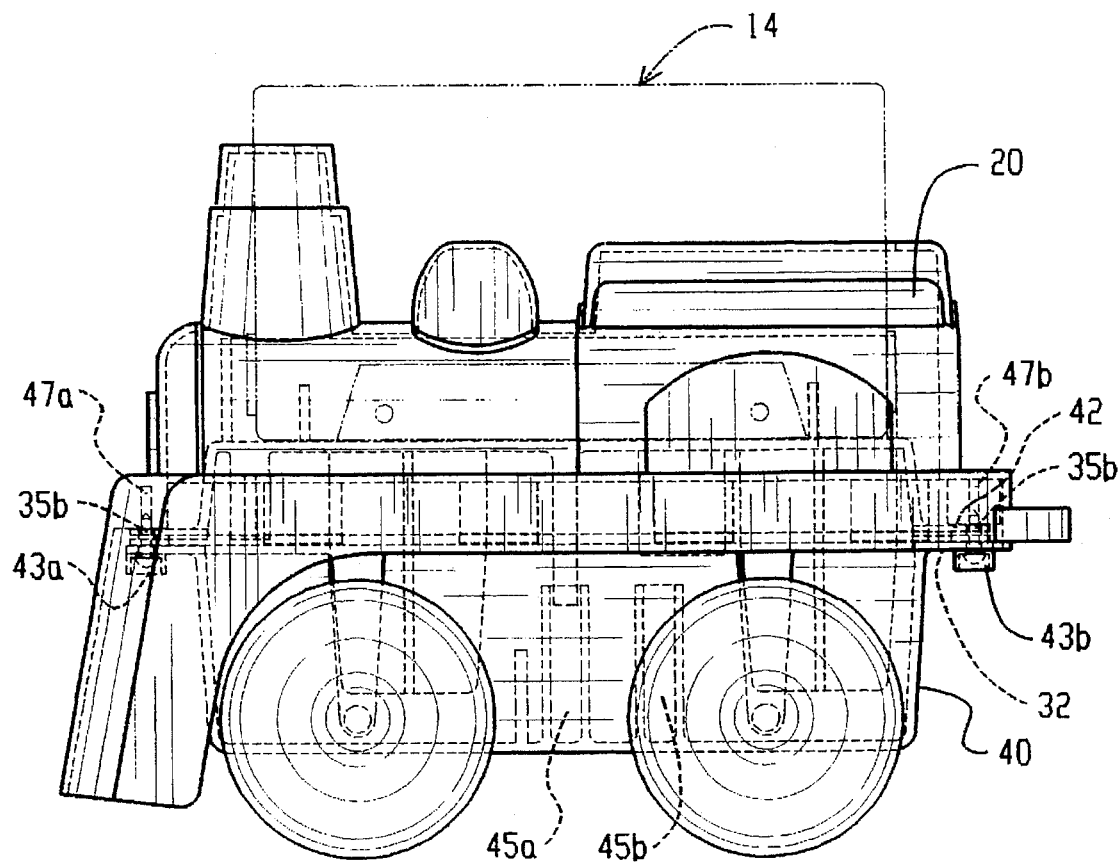
FIG 10 is a side elevation of an alternate embodiment of
a toy of the present invention.

As illustrated by comparison of FIGS. 2 and 10, the points of attachment of the horizontal chassis flange 42 to horizontal flange 32 of the universal cassette receptacle 26 can be selected for adaptive attachment to toy bodies of different overall length and configuration. For example, in the assembly of the school bus embodiment of the toy shown in FIG. 2, a fastener in fastener hole 43a secures horizontal chassis flange 42 directly to fastener hole 47a of body 20, and a fastener in fastener hole 43b secures horizontal flange 42 to fastener hole 37 of receptacle 26. Guide pin 36 is thereby aligned for insertion into rearward positioned guide pin hole 45b. A fastener in fastener hole 35b of receptacle 26 secures the aft end of the assembly to body 20 at body fastener hole 47b.

Figure 11:
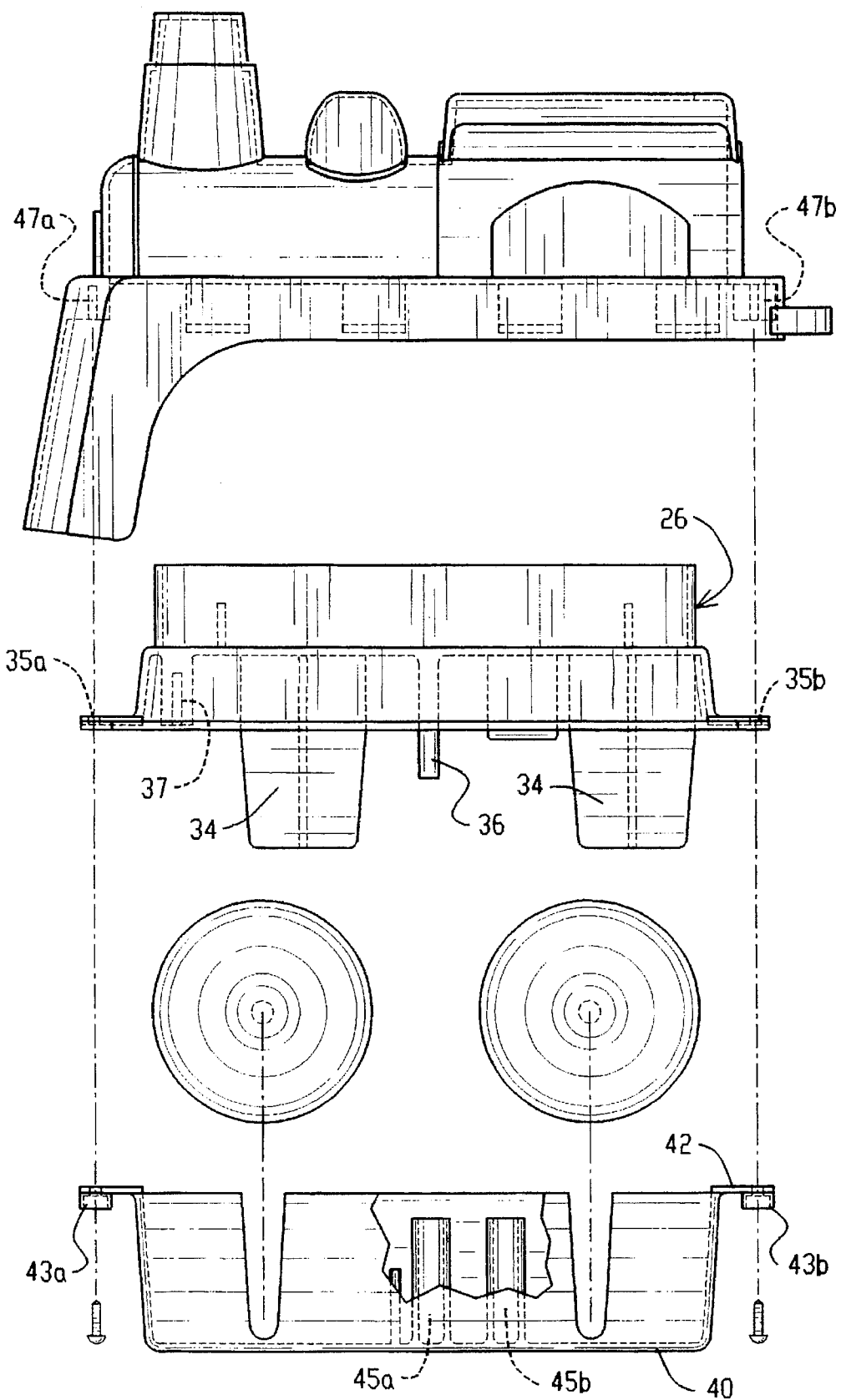
FIG. 11 is an exploded side elevation of the toy of FIG.
10.

Alternatively, as illustrated by the train engine embodiment of the toy shown in FIGS. 10 and 11, both forward and rearward positioned fasteners 43a and 43b of chassis flange 42 align respectively with fastener holes 35b and 35a Coy reverse orientation of receptacle 26) of cassette receptacle flange 32 and with corresponding fastener holes 47a and 47b in body 20. Guide pin 36 is thereby aligned for insertion into forward positioned guide pin hole 45a. Thus in accordance with the invention the universal cassette receptacle 26 is adaptable for attachment to a wide variety of toy bodies, eliminating the need to provide a unique cassette holding structure and mechanism for attachment to every variation of toy body in which the invention is executed.

Figure 7:
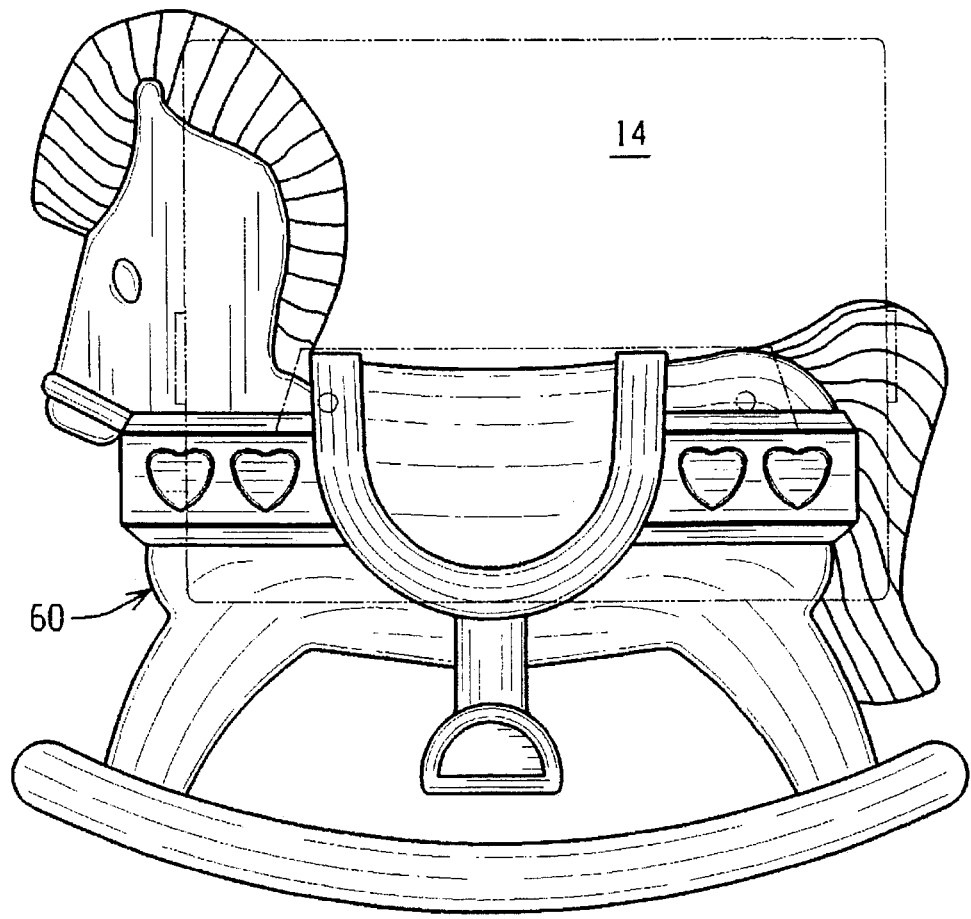
FIG. 7 is a side elevation of an alternate embodiment of
the toy of the present invention.
Figure 8:
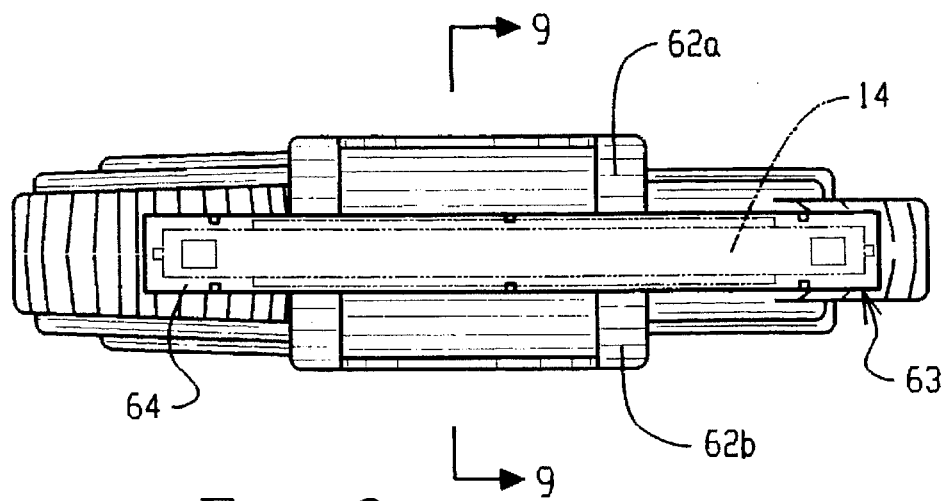
FIG. 8 is a top view of the toy of FIG. 7.
Figure 9:
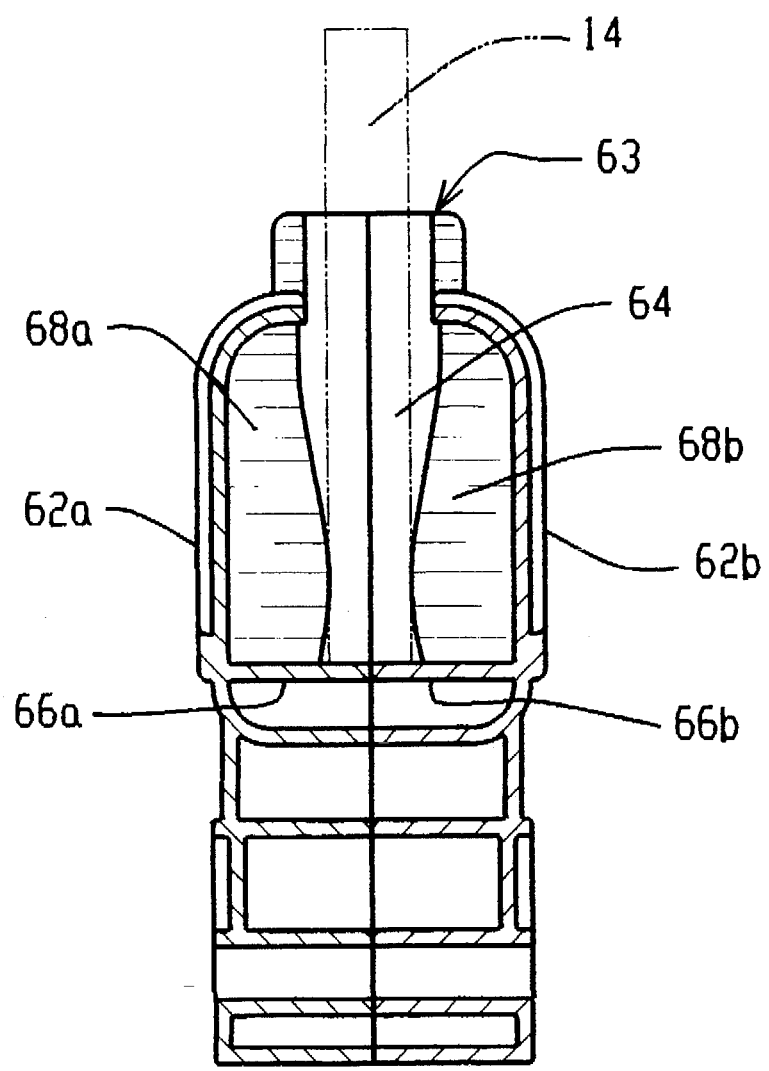
FIG. 9 is a cross-sectional view taken in the direction of
the arrows 9—9 in FIG. 8.

FIGS. 7–9 illustrate an alternate embodiment of the invention wherein the body 60 of the toy is configured to perform the cassette gripping function without the need for integral assembly with a separate cassette holding component. The toy body 60, in the form of a functional characterization of an animate object such as a rocking horse, includes symmetrical halves 62a and 62b which together form a cassette receiving cavity 64 between the halves and an opening 63 for insertion of a cassette therethrough substantial in the manner as previously described. The body 60 may be dimensioned to accommodate multiple cassettes side-by side in the manner of FIG. 6. As shown in FIG. 9, adjoining horizontal surfaces 66a and 66b extending inwardly from interior surfaces of each body half form a cassette supporting floor in cavity 64 positioned relative to the top of opening 63 to position the cassette(s) 14 in the partially exposed position shown. Vertically oriented frictional cassette engagement tabs 68a and 68b also extend inwardly from interior surfaces of the body halves to frictionally engage and retain the cassette(s) in cavity 64. When formed of plastic, body halves 62 may be secured together by pin-and-hole, snap tabs and/or adhesive as well known in the plastic arts.

Although the invention has been described with respect to certain preferred embodiments and methods, it is understood that certain obvious variations, modifications and additions may be made to the fundamental concepts herein described all within the scope of the invention as defined by the accompanying claims and equivalents thereof.

What is claimed is:

1. A toy in the form of a three dimensional characterization of an object or animal adapted for use as an amusement device and as a receptacle for a cassette, the toy comprising:

a body which defines the exterior form of the toy and a cavity in the body dimensioned to receive and frictionally engage at least one cassette, said cavity having an uncovered opening through which a portion of a cassette protrudes when fully inserted in said cavity of said body, further comprising a universal cassette receptacle insertable into said cavity of said body and secured to said body, wherein said universal cassette receptacle is attached to said chassis and said body of said toy, and wherein said universal cassette receptacle further comprises a pin guide and said chassis further comprises pin guide receiving holes for receiving said pin guide, whereby said universal cassette receptacle and said chassis are aligned for attachment and insertion into said body of said toy.

2. A universal cassette receptacle adapted to be disposed within a body of a toy and dimensioned to receive and frictionally engaging a cassette so that at least a portion of the cassette is held within said receptacle and partially surrounded by the body of the toy, the universal cassette receptacle comprising, a cassette receiving box defined by generally vertical walls extending from a generally horizontal base, said horizontal base having a flange portion which extends laterally beyond said vertical walls, and gripping tabs disposed within and extending generally perpendicularly inward from said vertical walls into an interior of said cassette receiving box to frictionally engage external surfaces of a cassette inserted into said cassette receiving box, the universal cassette receptacle further comprising a vertical flange which extends vertically downward from said horizontal base at a position adapted for insertion into a cavity of a separate part attachable to said universal cassette receptacle and to a body of a toy.

* * * * *